(12) United States Patent
Tanaka

(10) Patent No.: US 6,428,322 B1
(45) Date of Patent: *Aug. 6, 2002

(54) FILM IMAGE DISPLAY SYSTEM

(75) Inventor: Hiroyuki Tanaka, Yokohama (JP)

(73) Assignee: Nix Company Ltd., Tokyo (JP)

( * ) Notice: Subject to any disclaimer, the term of this patent is extended or adjusted under 35 U.S.C. 154(b) by 98 days.

This patent is subject to a terminal disclaimer.

(21) Appl. No.: 09/631,631

(22) Filed: Aug. 4, 2000

Related U.S. Application Data

(63) Continuation of application No. 09/342,063, filed on Jun. 29, 1999, now Pat. No. 6,129,553.

(30) Foreign Application Priority Data

Oct. 9, 1998 (JP) ............................................. 10-322770

(51) Int. Cl.[7] ...................... G09B 23/28; G09B 25/00; G09B 27/02

(52) U.S. Cl. ...................... 434/263; 434/365; 434/370; 434/428; 40/361; 40/363

(58) Field of Search .............................. 353/40, 44, 63, 353/79, 122; 359/443, 447, 460; 40/361, 362, 363, 364, 365, 366, 367; 434/263, 303, 314, 324, 365, 370, 428, 430

(56) References Cited

U.S. PATENT DOCUMENTS 6,129,553 A * 10/2000 Tanaka ........................ 434/263

* cited by examiner

*Primary Examiner*—John Edmund Rovnak
(74) *Attorney, Agent, or Firm*—Crowell & Moring LLP

(57) ABSTRACT

A developed film is illuminated to project its image onto a rear projection screen. A transparent case with a clear liquid filled therein is arranged, and the film is accommodated in the case. A writable transparent or translucent sheet is arranged over a front side of the rear projection screen.

13 Claims, 7 Drawing Sheets

FIG. 2A  FIG. 2B
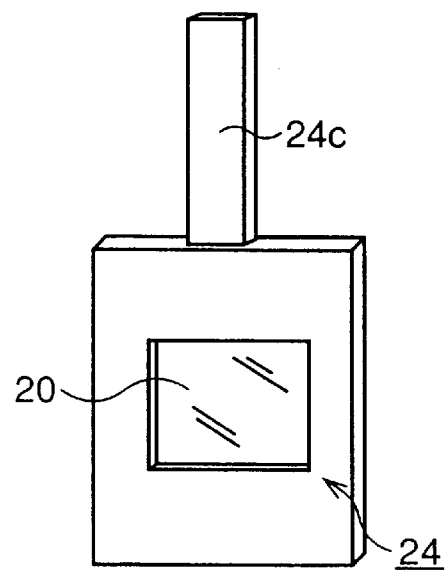
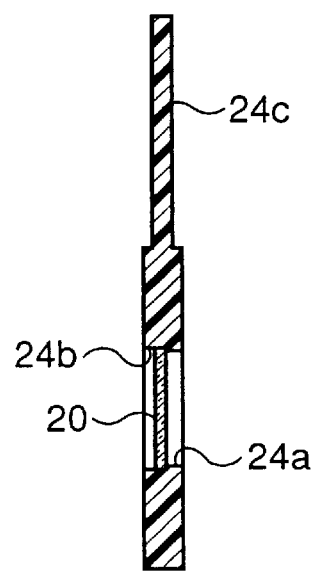
FIG. 2C
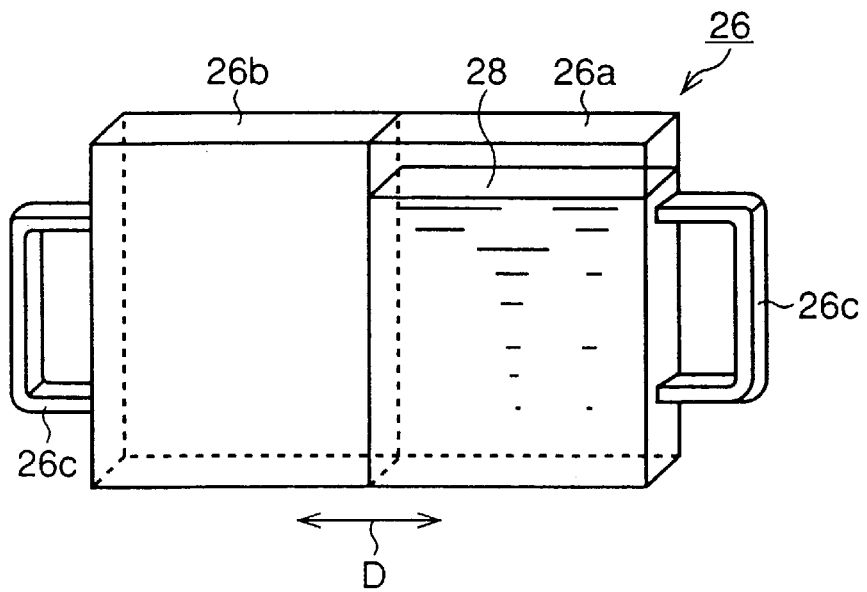

FILM IMAGE DISPLAY SYSTEM

CROSS-REFERENCE TO RELATED APPLICATION

This application is a continuation of application Ser. No. 09/342,063, filed Jun. 29, 1999, U.S. Pat. No. 6,128,553.

BACKGROUND OF THE INVENTION a) Field of the Invention

This invention relates to a film image display system, and specifically to a medical film image display system useful for the explanation or the like of a treatment to a patient.

b) Description of the Related Art

In a certain dental treatment, a dentist may conduct x-ray photography of one or more teeth and the associated gum of a patient and may then proceed with the treatment on the basis of the developed x-ray film. In this case, the treatment, orthodontics or the like is effected based on an informed consent, that is, after showing the developed film to the patient and explaining the conditions of the tooth or teeth and a treatment plan to be followed.

Subsequent to x-ray photography, a film is successively developed, fixed and rinsed in a developing processor. Because this film cannot be viewed or checked as long as it is wet, it has been the conventional practice to dry the developed film and then to view or check it by exposing the same on the rear side thereof to light from a plane light source or the like. A variety of methods are known for drying such a film, including blowing warm air against the film. Whichever method is employed, some time is needed to dry it.

Since it takes certain time to dry the film as mentioned above, the explanation to the patient has to be deferred until the film dries. It has hence been impossible to promptly give an explanation to a patient.

Further, upon making an explanation to a patient about the conditions of teeth and the details of a treatment, it should be easier for the patient to understand the explanation if the dentist can write his explanation on the film. Conventional methods, however, do not permit writing on films, so that such explanations are not fully understandable with ease.

SUMMARY OF THE INVENTION

With the foregoing in view, an object of the present invention is to achieve a further improvement in the convenience of conducting a treatment by making use of an x-ray film and also of explaining the treatment to the patient.

In one aspect of the present invention, there is thus provided a film image display system for displaying an image of a developed film by illuminating the developed film and projecting the image onto a rear projection screen, wherein the system is provided with a transparent case in which a clear liquid is to be filled, and the film is accommodated in the case.

In another aspect of the present invention, there is also provided a film image display system for displaying an image of a developed film by illuminating the developed film and projecting the image onto a rear projection screen, wherein a writable transparent or translucent sheet is arranged over a front side of the rear projection screen.

Means for displaying the image of the film is not limited to the above-described screen, but display means such as LCD (liquid crystal display), CRT (cathode ray tube) or a plasma display can also be used. In the latter case, video signals are sent to such display means by using image pickup means (such as CCD sensor, camera or the like) that reads the image of the developed film.

According to the present invention, a wet film can be projected immediately. Further, writing is feasible over a projected image. The convenience of conducting a treatment by making use of an x-ray film and also of explaining the treatment to the patient can therefore be improved further.

BRIEF DESCRIPTION OF THE DRAWINGS

FIG. 2A is a front view of a film holder, FIG. 2B is a cross-sectional view of the film holder, and FIG. 2C is a perspective view of a transparent case;

FIGS. 5A through 5C illustrate a modification of the film holder, in which FIG. 5A is a front view of a film, FIG. 5B is a front view of the modified film holder, and FIG. 5C is a cross-sectional view of the modified film holder taken in the direction of arrows VC—VC of FIG. 5B;

DETAILED DESCRIPTION OF THE INVENTION AND PREFERRED EMBODIMENTS

Figure 1:
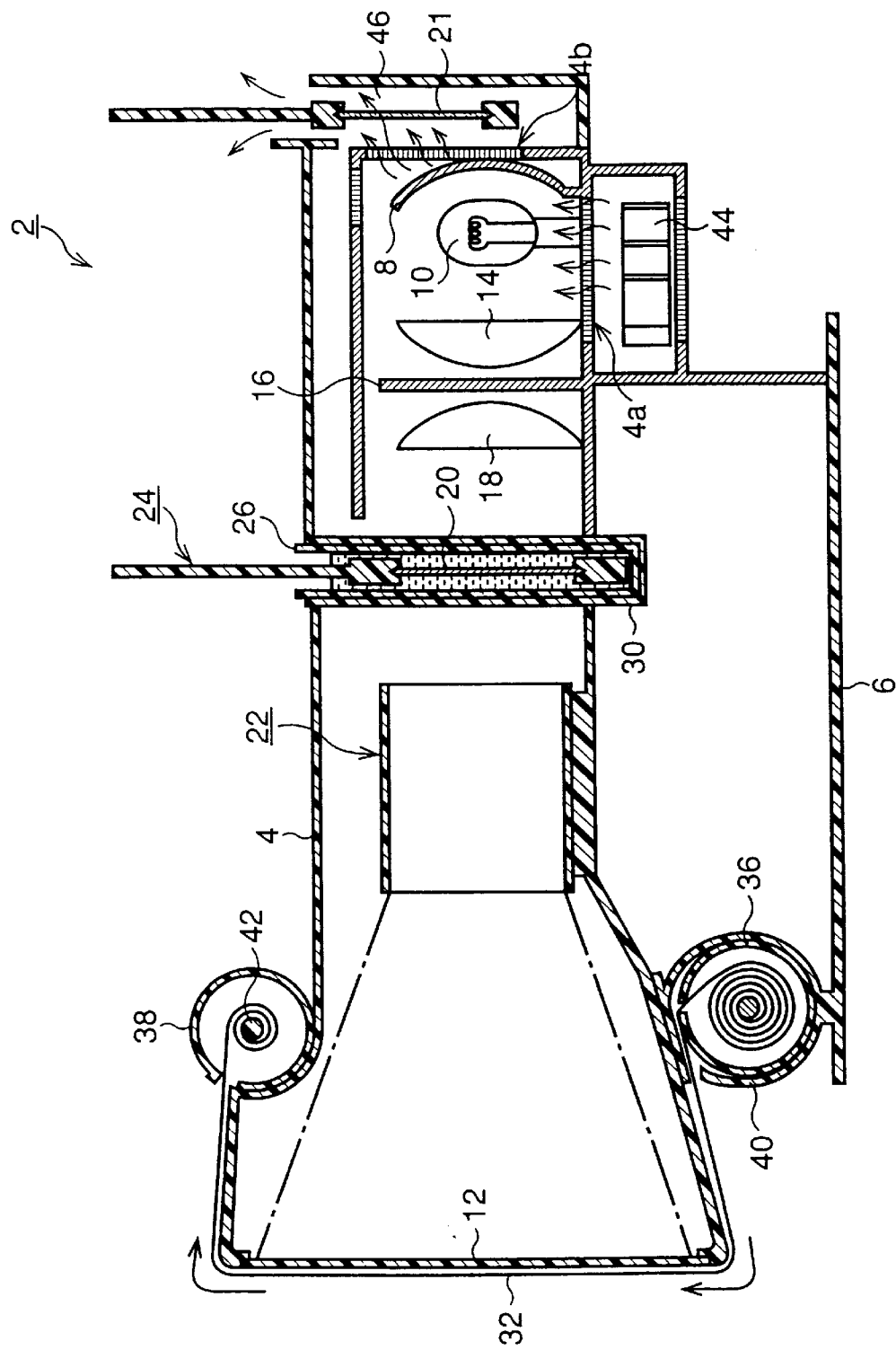
FIG. 1 is a cross-sectional view illustrating a film image display system according to a first embodiment of the present invention.

Referring first to FIG. 1, the first embodiment of the present invention will be described. The film image display system, which is designated at numeral 2, is a projector-type system and is provided with a housing 4 and a base 6 which supports the housing 4 thereon. Inside the housing 4, there are arranged at an end thereof (at a right end as viewed in FIG. 1) a light source (lamp) 10 provided with a reflector 8 and at an opposite end thereof (at a left end as viewed in FIG. 1) a rear projection screen 12. A Fresnel lens is mounted over a front side of the screen 12. From the light source 10 toward the screen 12, a condenser lens (converging system) 14, a heat filter 16, another condenser lens (converging system) 18, a developed film 20 and a projection lens 22 are arranged successively.

The film 20 may be, for example, a dental x-ray film of 30×40 mm (already developed) and, as is depicted in FIGS. 2A and 2B, is mounted on a film holder 24. Through the film holder 24, an opening 24a is formed. Stepped portions 24b are formed around the opening 24a, and the film 24 is detachably fitted on the stepped portions 24b. A finger grip 24c is formed extending from an upper part of the film holder 24.

The film holder 24 is accommodated in a transparent case 26 such as that as shown in FIG. 2C. This transparent case 26 is provided with two compartments 26a, 26b. The compartment 26a is filled with water 28, while the compartment 26b is empty. Handles 26c are attached to opposite side walls of the transparent case 26, respectively. Any material can be used as the material of the transparent case 26 insofar as it permits transmission of light from the light source 10. A colored material may be used.

On an optical path in the housing 4, a case receiver 30 such as that depicted in FIG. 1 is arranged, and the transparent case 26 is slidably (in the direction indicated by an arrow D in FIG. 2) placed in the case receiver 30. The film 20 is placed in the water compartment 26a when it is wet, but is placed in the empty compartment 26b when it is dry. By holding the handles 26c, the transparent case 26 is caused to slide to place the film 20 on the optical path. Accordingly, the film 20 is arranged so that it is illuminated by light from the light source 10.

The projection lens 22 is composed of one or more optical elements and projects the image of the film on an enlarged scale onto the rear side of the screen 12.

Figure 3:
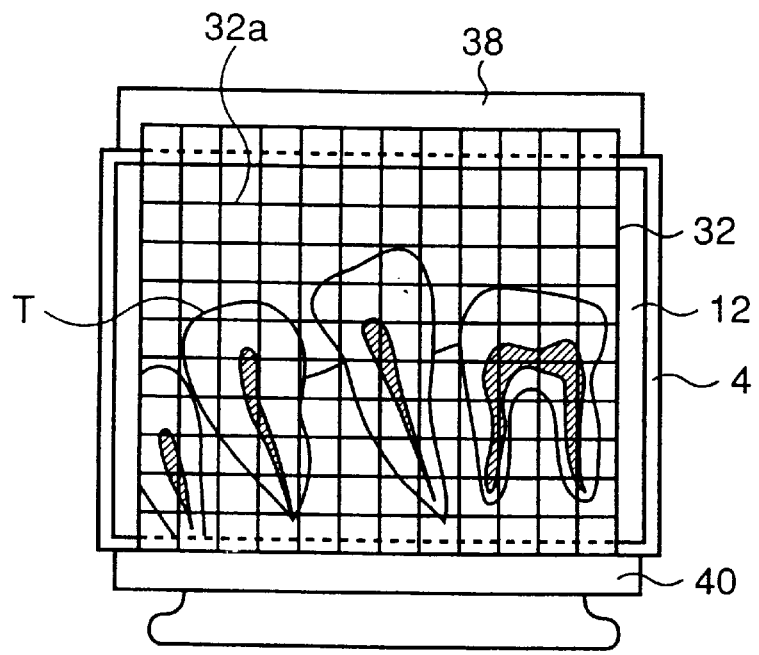
FIG. 3 is a front view of the film image display system.

Over the front side of the screen 12, a sheet 32 is arranged as illustrated in FIG. 3. This sheet 32 is transparent, or is translucent to such an extent that an image T projected onto the screen 12 is visible through the sheet 32. No particular limitation is imposed on the material of the sheet 32, and any material can be used insofar as it permits writing with a writing instrument. The sheet 32 is applied with cross-ruled scale marks 32a. These scale marks are shown as coarse ones in FIG. 3 to facilitate the description. Actually, however, finer scale marks are used to permit a measurement on the basis of the image projected onto the screen 12 (for example, a measurement of the root canal length of a tooth). The scale of these scale marks is set in proportion with the magnification of the image such that actual lengths can be measured by relying upon the scale marks 32a.

Figure 4:
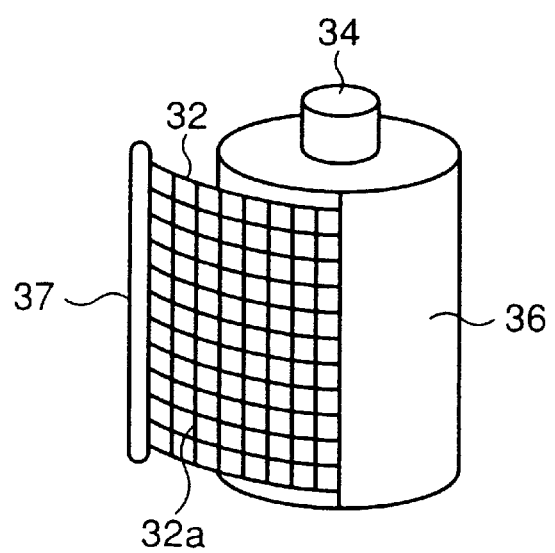
FIG. 4 is a perspective view of a sheet cassette.

The sheet 32 is supplied in the form of a cassette as depicted in FIG. 4. Described specifically, the sheet 32 is wound on a spool 34 and is accommodated within a cylindrical sheet cassette 36. A rod 37 is attached to a leading end portion of the sheet 32. Both above and below the screen 32, cylindrical sheet holders 38, 40 are mounted on the housing 4, and the sheet cassette 36 is loaded in the sheet holder 40. The sheet holder 40 is provided with bearings (not illustrated), on which the spool 34 is supported. By these bearings, the spool 34 is normally biased in a direction in which the sheet 32 is wound into the sheet cassette 36. On the other hand, the sheet holder 38 is provided with a take-up spool 42, so that the sheet 32 is wound out of the sheet holder 40, extends over the front side of the screen 32, and is then taken up on the take-up spool 42. As the sheet 32 is normally biased under tension toward the sheet holder 40, the sheet 32 remains in close contact with the front side of the screen 12. The take-up spool 42 is rotated manually or by motor drive (not illustrated), whereby the sheet 32 is taken up over a predetermined length or a desired length each time.

The take-up spool 42 is provided with means for finely adjusting a taken-up length although it is not illustrated in any drawing. As an example of such fine adjustment means, a rotatable knob may be arranged to rotate the take-up spool 42 via a gear mechanism which is provided with a stopper (pawl or the like) for the prevention of reverse rotation. The sheet can be taken up over a desired length by manually rotating the rotatable know in a winding direction. As the sheet 32 is pulled toward the sheet holder 40, release of the stopper allows the sheet 32 to move in the wound-in direction. As is readily appreciated from the foregoing, the position of a desired one of the scale marks 32 can be brought into registration with a specific part of the image by manipulating the rotatable knob and the stopper to move the sheet 32 over a very small distance.

As is depicted in FIG. 1, a cooling fan 44 is arranged below the light source 10, and cooling air is fed to the light source 10 through air inlet holes 4a formed through the hosing 4. Behind the reflector 8, a drying compartment is formed. The drying compartment 46 is in communication with the interior of the housing 4 through air outlet holes 4b, so that air which has been heated up by the light source 10 advances to the drying compartment 46 through the air outlet holes 4b and is then discharged to the outside. If a wet film 21 is placed in the drying compartment 46, it is promptly dried by warm air which is indicated by arrow marks in FIG. 1.

Use of the above-described film image display system 1 makes it possible to perform good projection even in the case of a wet film shortly after its development, because the film is placed in the water compartment 26a and is then exposed to light. It the wet film were projected as is, in other words, before drying the same, droplets or the like which still remain on the film would also be projected so that no good image would be available. The placement of the film in the water compartment 26a has made it possible to eliminate such a problem. Further, a film is accompanied with slight ruggedness on surfaces thereof. If the film were illuminated as is, the illuminating light would be irregularly reflected. Immersion of the film in a liquid as described above can eliminate such ruggedness, thereby making it possible to avoid irregular reflection and hence to obtain a clear image.

According to the system described above, writing is feasible on the sheet 32. Understanding of an explanation to a patient can be facilitated further if an explanatory sketch is drawn over an image of teeth. A fresh part of the sheet is then caused to appear by taking up the sketch-bearing part of the sheet. This allows to make an explanation about another image with reference to another explanatory sketch drawn o the fresh part of the sheet.

Further, the sheet 32 is applied with the scale marks 32a. One of the scale marks 32a can therefore be brought into registration with a reference point on an image of teeth by finely adjusting the position of the sheet with the fine adjustment means. This makes it possible to measure a target part (for example, the root canal length of one of the teeth). Incidentally, the scale marks may also be formed directly on a surface of the screen 12 or a surface of the transparent case 26 without being limited to the sheet.

After finishing the projection, the film is transferred together with the film holder to the drying compartment 46, where the film can be dried. The film so dried can then be projected by inserting it into the empty compartment 26b and sliding the transparent case 26.

Figure 5A:
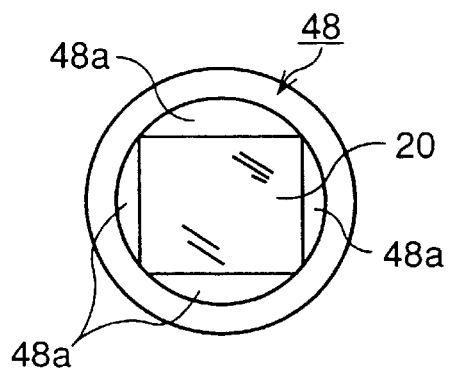
Figure 5B:
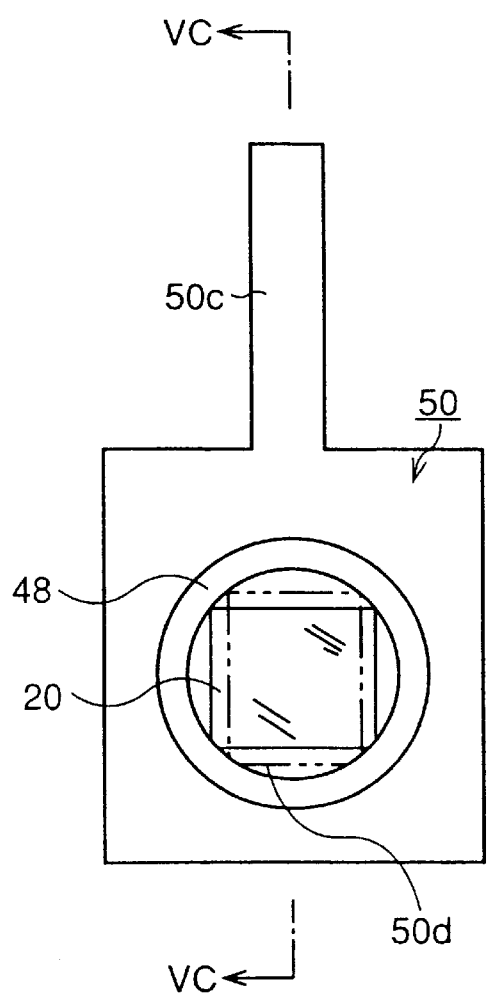
Figure 5C:
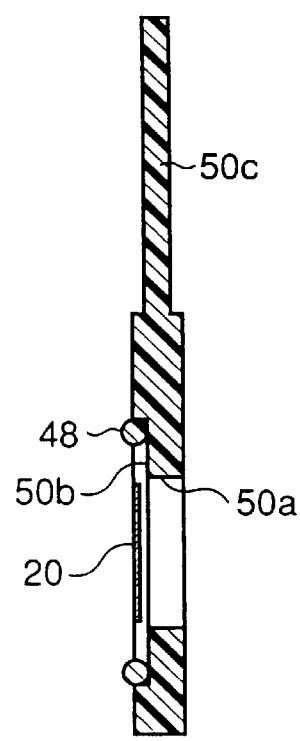

In FIGS. 5A through 5C, the modification of the film holder is depicted. In this modification, the film 20 is developed in a state fitted in a ring-shaped frame 48. An opening 50a is formed through a film holder 50, and stepped portions 50b are formed around the opening 50a. The frame 48 is detachably fitted on the stepped portions 50b. A finger grip 50c is formed extending from an upper part of the film holder 50. The opening 50a is formed in the same size and shape as the film 20. Accordingly, the shape of each stepped portion 50b is determined such that a corresponding space 48a, which is surrounded by the frame 48 and the film 20 (see FIG. 5A), is shielded from light by the stepped portion 50b. To use the film in an upright position, it is only necessary to form an opening 50d such that like the film, its longer sides extend in the vertical direction as indicated by phantoms in FIG. 5B.

FIG. 6 illustrates an example in which LCD is used as display means. The film image display system, which is designated at numeral 60, is composed of a base 62, a main body 64, and LCD 66. Over a front side of the display 66, a sheet 32 is arranged in a similar manner as in the system of FIG. 1. On a side wall of the main body 64, a transparent case mount 68 is formed. On this transparent case mount 68, a transparent case 26 which is similar to that shown in FIG. 2C is placed. In the transparent case 26, a film holder 50 similar to that depicted in FIGS. 5A to 5C is accommodated. As a display, another display means such as CRT or a plasma display may be used besides LCD.

The film image display system 60 is provided with an external input terminal 67 and a selector switch 69, both of which are for use with a camera for photographing the inside of the mouth (intraoral camera 80). The intraoral camera 80 is provided with a stick-shaped, intraorally-inserted section 82, a handle 84 and a cord 86. The intraorally-inserted section 82 is equipped at a free end thereof with an illuminating portion 82a for illuminating the inside of the mouth and a photodetecting portion 82b. A plug which is connected to a free end of the cord 86 is inserted in the external input terminal 67, and the selector switch 69 is changed over toward the camera. The free end of the intraorally-inserted section 82 of the camera 80 is inserted into the mouth of a patient, and a part photography of which is desired is illuminated by the illuminating portion 82a. Reflection light from the part is detected by the photodetecting portion 82c, and the light so detected is converted into video signals by a CCD sensor or the like. These video signals are then transmitted to the display system 60 via the cord 86. At the display system 60, an image T of teeth is displayed on the LCD 66 on the basis of the video signals. Use of the above-described system makes it possible to selectively display both of a photofluorographic image on the basis of an x-ray film and a visual image obtained by the camera 80. This makes it possible to more precisely determine the condition of teeth and hence to perform more appropriate diagnosis and treatment.

Recently, a new x-ray photographing method is performed. According to this new method, an x-ray CCD sensor is inserted in the mouth and is positioned in contact with the inner sides of teeth the x-ray photography of which is desired. X-rays are irradiated from the outside such that an image of the object is formed on a surface of the CCD sensor. It is therefore possible to display an image by inputting signals from an x-ray CCD sensor 87 into a video signal generator 88 to produce video signals and then inputting the video signals to the film image display system 60, as illustrated in FIG. 6B. Here, the image signal generator 88 is provided with memory means for storing video signals. The above-described system requires only the x-ray CCD sensor 87, the video signal generator 88 and LCD 66 and makes it possible to obtain an x-ray dental image by the simple construction. Moreover, observation of the image with an explanatory sketch or the like directly drawn on the sheet 32 and/or with the scale marks 32a maintained in contact with the image makes it possible to achieve a precise diagnosis and to obtain an informed consent even if the system is not equipped with a costly digital computer.

Figure 6A:
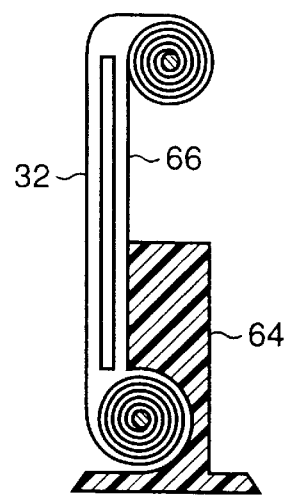
FIG. 6A is a cross-sectional view showing a film image display system according to a second embodiment of the present invention.
Figure 6B:
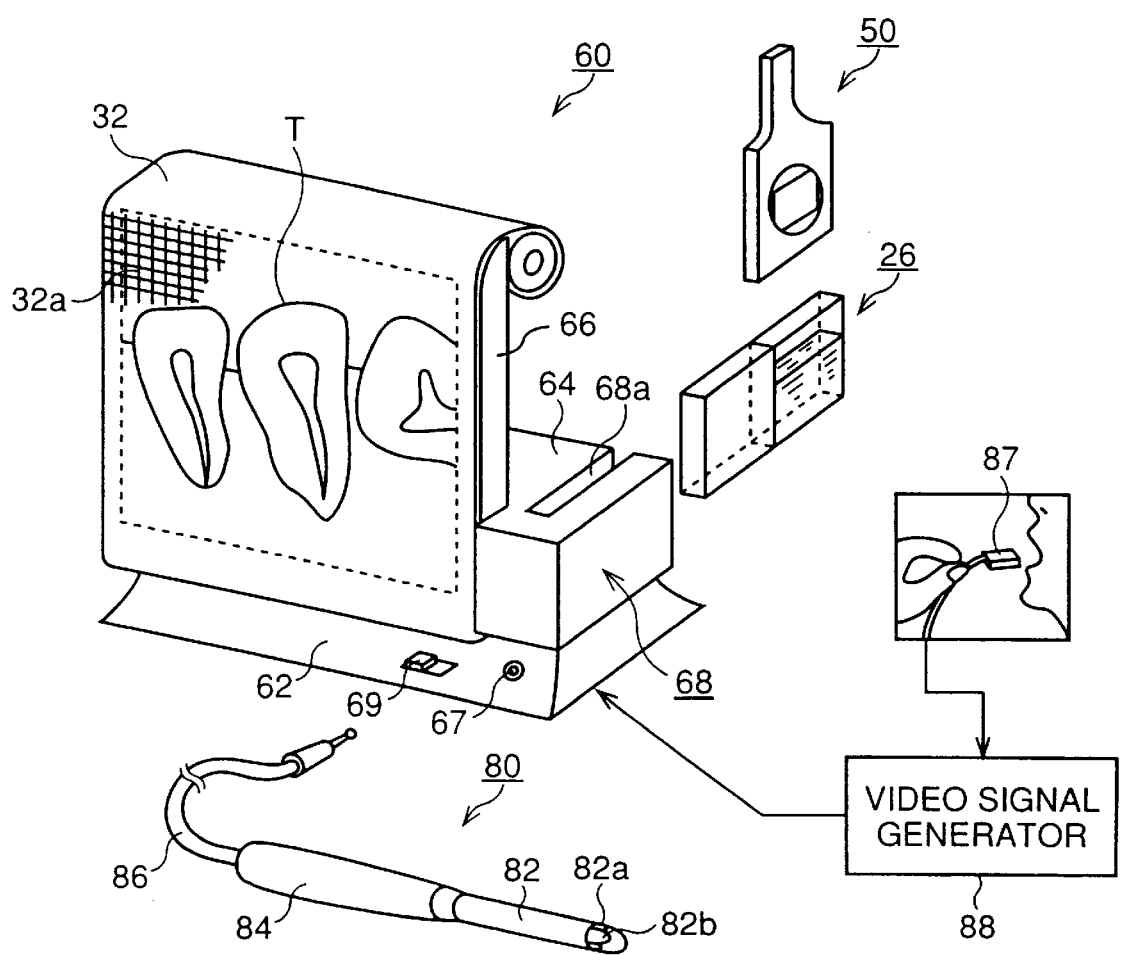
FIG. 6B is a perspective view of the film image display system according to the second embodiment of the present invention.
Figure 9:
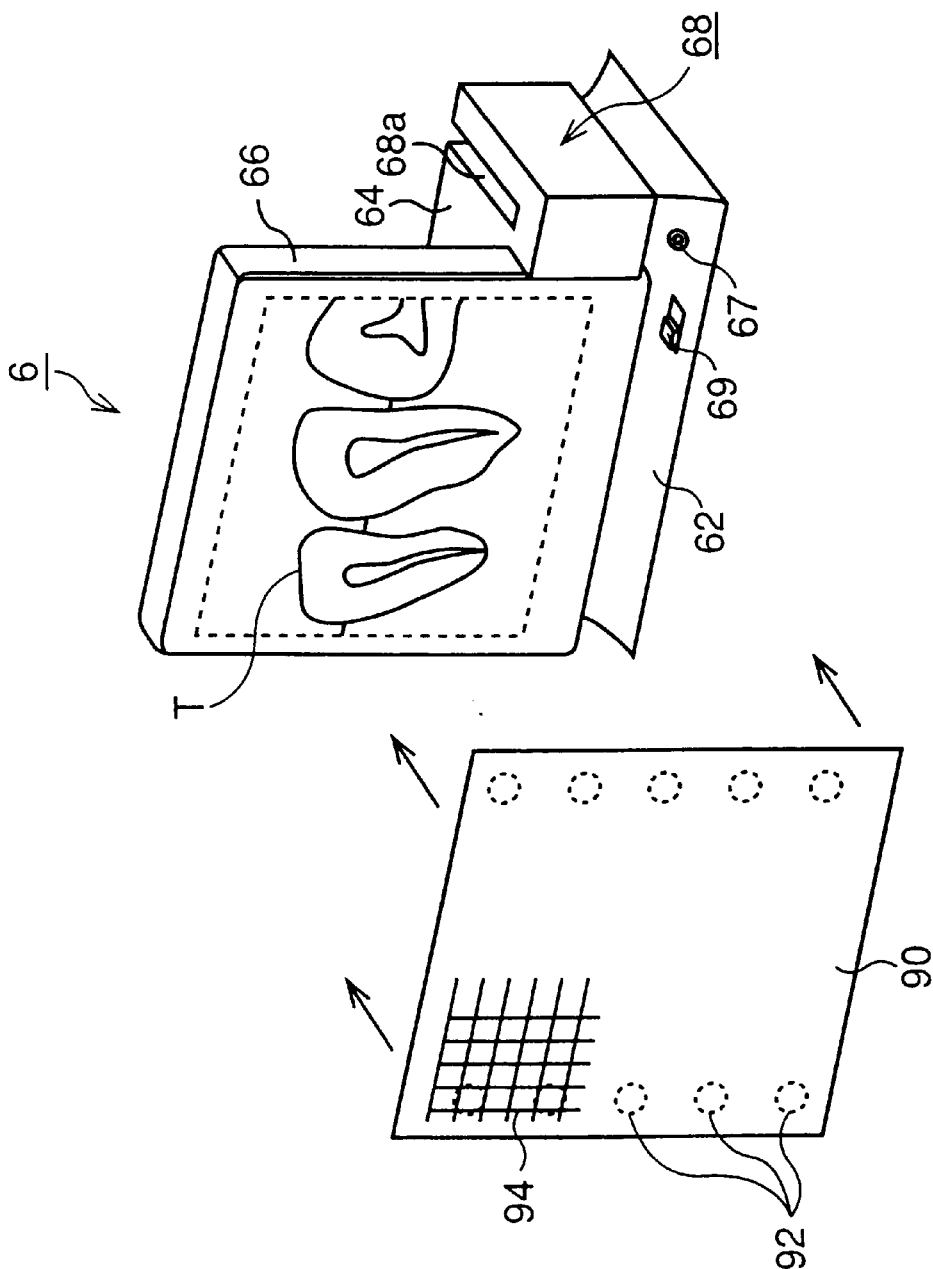
FIG. 9 is an exploded perspective view of a modification of the film image display system according to the second embodiment of the present invention, which shows another example of a writable sheet.

The sheet 32 in FIGS. 6A and 6B is of the rolled type. As an alternative, a cut paper sheet 90 depicted in FIG. 9 may also be used. The sheet 90 is transparent or translucent, and no particular limitation is imposed on its material. It may be made of paper, a resin or the like insofar as writing is feasible with a writing instrument. An adhesive 92 is coated along edges of the sheet 90. With this adhesive, the sheet 90 can be bonded to a surface of LCD 66. After the sheet becomes no longer needed subsequent to the drawing of an explanatory sketch on the sheet, the sheet can be readily peeled off and replaced by a fresh sheet. The sheet 90 may be applied with cross-ruled scale marks 94.

Figure 7:
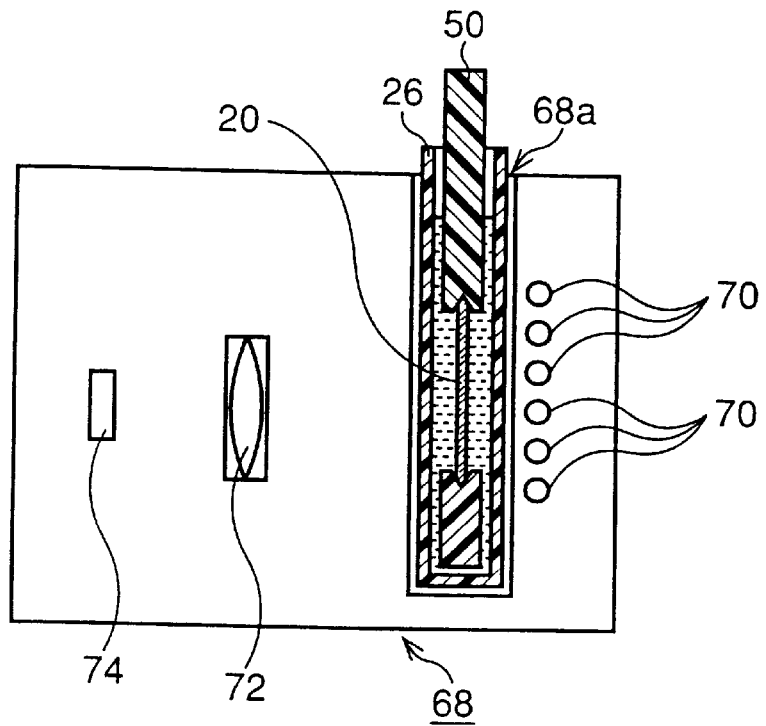
FIG. 7 is an enlarged cross-sectional view of a transparent case mount in the film image display system according to the second embodiment of the present invention.

Referring next to FIG. 7, the transparent case mount 68 will be described in detail. The transparent case 26 is inserted in a case-mounting slot 68a formed in the mount 68. A plurality of light sources 70 and an optical system 72 are arranged opposite sides of the slot 68a, respectively, such that the slot 68a is interposed between the light sources 70 and the optical system 72. Light from the light sources 70 advances through the film 20, and is converged by the optical system 72 so that an image is formed on a CCD sensor 74. Image data of the film 20 are outputted from the CCD sensor 74 to an image processor (not shown) in the main body 64, whereby a film image T such as that illustrated in FIG. 6B is displayed. In place of the above-described optical system 72 and CCD sensor 74, a CCD camera or the like may also be used.

Use of the above system makes it possible not only to bring about similar advantageous effects as the system of FIG. 1 but also to make the whole system compact owing to the use of LCD. The above system is therefore convenient for a dentist to keep it at hand for use in making explanations to patients.

Figure 8:
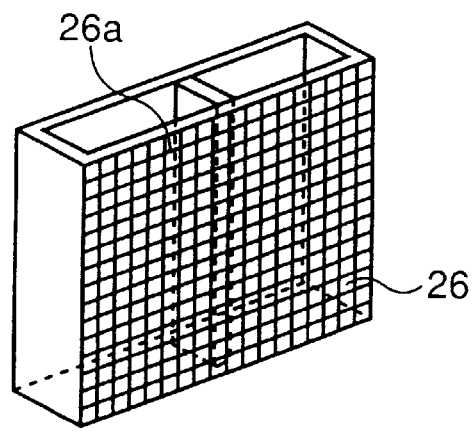
FIG. 8 is an enlarged perspective view of a transparent case in the film image display system according to the second embodiment of the present invention.

FIG. 8 illustrates, by way of example, the transparent case which is designated at numeral 26 and carries scale marks 26a applied thereon. The scale marks 26a may be applied by directly printing them on the transparent case 26 or by affixing a seal, on which the scale marks are printed, onto the transparent case 26. As a consequence, the scale marks 26a are displayed on the photographed image. Advance setting of the scale of the scale marks therefore makes it possible to precisely determine the dimensions of a photographed part, thereby facilitating the observation and measurement of teeth (measurement of their root canal lengths). The accuracy of a measurement becomes better as the scale marks 26a are arranged with smaller intervals. The accuracy can be selected as desired depending on the purpose of use or the like. Because the pattern of the scale marks has already been applied to the original image and the original dimension of the scale marks is known, the dimensions and the like of teeth can be easily determined even when the resulting digital image is subjected to various image processing. In other words, measurements of teeth can be easily performed without needing complex software processing such as those required by conventional dental digital x-ray systems.

The scale marks may be formed on a surface of LCD 6.

The transparent case 26 also has valuable utility by itself. Described specifically, accommodation of a developed film together with a clear liquid in the transparent case makes it possible to read the image of the film even if the film is wet. Further, formation of scale marks on a surface of the transparent case 26 can bring about the above-mentioned advantageous effects. This transparent case 26 may be combined with image pickup means such as a camera. This combination makes it possible to easily obtain video signals indicative of the image of the film, and the image of the film can be easily displayed by inputting the video signals to a conventional monitor or the like.

The above-described systems 2, 60 may be provided with a mode in which they can be used as film viewers for checking films. For example, these systems can be used as film viewers by providing them with a mode in which the view screen is rendered brighter in the screen 12 or a display such as LCD or CRT.

In the embodiments described above, water was used as a liquid. However, the liquid is not limited to water, and colored liquid may also be used. In essence, liquids other than water may be used insofar as they are clear. Further, the sheet 32 was described by taking a continuous paper sheet such as a rolled paper sheet as an example. The sheet is however not limited to such a continuous paper sheet, and a cut paper sheet may be applied onto the view screen. In the embodiment shown in FIG. 1, the image was directly projected onto the screen 12 from the projection lens 22. A more enlarged image can however be obtained while keeping the system compact, provided that the film is projected onto the screen 22 by deflecting light with one or more deflection mirrors or the like. As such deflection mirrors, those applied with a reflection-increasing coating to avoid a reduction in the quantity of reflected light can be used preferably.

In general, the present invention can be applied to all developed films. Especially, use of the present invention for a dental film makes it possible to promptly project an x-ray film on an enlarged scale after its rinsing. The present invention can therefore bring about the advantageous effect that a dental treatment and its explanation to a patient can be performed promptly in a manner readily understandable by the patient.

This application claims the priority of Japanese Patent Application No. HEI 10-322770 filed Oct. 9, 1998, which is incorporated herein by reference.

What is claimed is:

1. A film image display system for displaying an image of a developed film comprising a transparent case to hold a clear liquid, a film holder to hold a developed film in the clear liquid, a source of illumination disposed on one side of said transparent case, said transparent case being adapted to have a rear projection screen disposed on the other side thereof and spaced therefrom, and a lens system disposed between said transparent case and said rear projection screen at a predetermined distance to focus an image from said developed film onto said screen.

2. A film image display system according to claim 1, further comprising a writable transparent or translucent sheet arranged over a front side of said rear projection screen.

3. A film image display system according to claim 2, wherein scale marks are formed on said transparent or translucent sheet.

4. A film image display system according to claim 1, wherein scale marks are formed on a surface of said transparent case.

5. A film image display system according to claim 1, wherein scale marks are formed on a surface of said screen.

6. A film image display system comprising a transparent case for accommodating therein a developed film together with a clear liquid; a source of illumination disposed on one side of said transparent case; an image pickup device disposed on the other side of said transparent case adapted to read an image of said film which is accommodated in said clear liquid within said transparent case and illuminated by said source of illumination, said image pickup device generating video signals.

7. A film image display system according to claim 6, wherein a writable transparent or translucent sheet is arranged over a front side of said display.

8. A film image display system according to claim 6, wherein scale marks are formed on said transparent or translucent sheet.

9. A film image display system according to claim 6, wherein scale marks are formed on a surface of said transparent case.

10. A film image display system for displaying an image of a developed film comprising a transparent case to hold a clear liquid, a film holder to hold a developed film in the clear liquid, a source of illumination disposed on one side of said transparent case, an optical system disposed on the other side of the transparent case at a predetermined distance to focus an image from said developed film onto a pickup device which generates a signal corresponding to said image.

11. A film image display system according to claim 10, further comprising an external input terminal for permitting connection of an intraoral camera to said film image display system.

12. A film image display system according to claim 10, wherein said pickup device is a CCD.

13. A film image display system according to claim 10, wherein said source of illumination comprises a plurality of light sources.

* * * * *